Nov. 8, 1932.  H. S. WALKER  1,886,993

PACKING AND PROCESS OF MANUFACTURE

Filed July 23, 1928

Adhesive Gum
2%

Pliable shredded soft metal
60%

Long staple fiber
11%

Sulphur
1%

Graphite
23%

Lubricant
3%

Witness

Inventor
Herbert S. Walker,
By H. R. Willson & Co.
Attorneys

Patented Nov. 8, 1932

1,886,993

UNITED STATES PATENT OFFICE

HERBERT STANLEY WALKER, OF MAMARONECK, NEW YORK, ASSIGNOR TO THE ALLPAX COMPANY, INC., OF MAMARONECK, NEW YORK, A CORPORATION OF NEW YORK

PACKING AND PROCESS OF MANUFACTURE

Application filed July 23, 1928. Serial No. 294,643.

The invention aims primarily to provide a new and improved packing in a loose, dry, shredded form which may have a wide field of use in stuffing boxes for rods, shafts, etc., the packing being of such nature that it may be readily compressed into a solid ring around the shaft, rod or the like, simply by tightening of the usual gland of the stuffing box, this result being obtainable in actual practice with stuffing boxes ranging in size from the smallest to the largest.

A further object is to provide a unique process for producing the product in an efficient and industrially practicable way.

With the foregoing in view the invention resides in the novel subject matter hereinafter described and claimed, description being accomplished by reference to the accompanying drawing.

The improved packing consists of long asbestos fibre, soft metal preferably shredded, graphite, lubricant, sulphur and rubber, in approximately the following proportions:—

| | Per cent |
|---|---|
| Unvulcanized rubber | 2 |
| Metal | 60 |
| Long staple fibre | 11 |
| Sulphur | 1 |
| Graphite | 23 |
| Lubricant | 3 |

The percentages above given may be altered to the extent of either a reduction or an increase in percentage of any one or more of the individual materials. The range of alterations is usually within 10%. Then too, in place of rubber, even though the latter is preferred, other bonding material such as gutta-percha, balata, or any of the superior hydrocarbon or resin gums may be used. In describing one example of the packing, I will refer primarily to the use of rubber but any of the substantial equivalents or substitutes such as those named may be read in place of this word.

Pure gum rubber is used, formed into a solution or "gel" as hereinafter explained and no vulcanizing of this rubber takes place during the process of manufacture.

The metal used may be of different bases or alloys of metals and is always comparatively soft and pliable. For temperatures not exceeding 600° F., lead alloyed with a small percentage of tin is used, having a melting point around 650° F. For temperatures in excess of 650°, copper is preferably employed, and for use under various chemical conditions, tin, aluminum or other appropriate metal may be used. The metal is preferably "shredded" so that it consists of a myriad of strips of desired length, for instance from one-half to one inch. These strips may well be approximately one-sixteenth inch in width and one-sixty-fourth of an inch in thickness.

The asbestos fibre is not short such as usually employed, but is a long, staple fibre of high grade and is finely carded, making the bond more secure than when a short fibre is used. The strands of this fibre range anywhere from three-quarters of an inch to three inches in length.

Ordinary industrial sulphur and flake graphite are used but for the lubricant, a pure palm oil is employed which assists materially in helping to shape the ring as it gives to the packing an additional molding property, which property is also due to a large extent to the rubber.

In mixing the ingredients, the following steps are employed:—

The pure rubber gum is mixed with an appropriate solvent to produce the solution or "gel". This solution is poured into a mixing machine. Then, while the machine is operating, the metal is added, then the graphite, then the sulphur, then the lubricant and finally the asbestos fibre. The fibres are added in a loosely divided form, so that each fibre becomes coated with the solution, graphite, lubricant mixture. The metal strips become similarly coated and in fact there is a substantially homogeneous mixture of ingredients in the dough-like material formed by mixing in the prescribed way.

Figure 1:
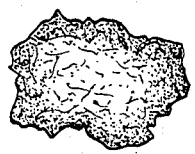
Figs. 1 to 6 illustrate the ingredients used in producing the packing.
Figure 2:
Figure 3:
Figure 4:
Figure 5:
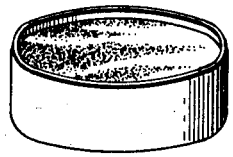
Figure 6:
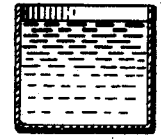
Figure 7:
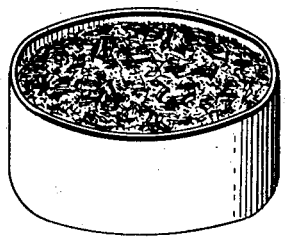
Fig. 7 is a perspective view showing a quantity of the packing as manufactured and placed on sale.
Figure 8:
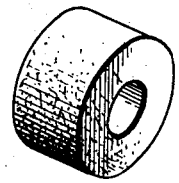
Fig. 8 is a perspective view of a packing ring formed from the packing simply by the operation of tightening the usual packing gland after filling the stuffing box.

After all ingredients are homogeneously mixed, the solvent-charged material is laid upon a steam-heated chest or other appropriate drier to evaporate the solvent, after which such material is again placed in the mixing machine or in some other adequate machine to disintegrate the same, leaving it in dry loose form for market. In this dry form, the packing may be placed in any size or kind of stuffing box and upon tightening of the gland, will be formed into a solid packing ring as illustrated in Fig. 8 of the drawing. This ring possesses maximum sealing, wear-resisting and lubricating properties, yet the lubricant is so confined in the mass that it is impossible, even under unusual heat conditions, to cause any of said lubricant to ooze from the stuffing box.

There have been many packings made of a so-called plastic type, but for various reasons they have all been more or less inefficient and in the great majority of cases have been utter failures. The present packing however, in almost innumerable applications, has proven to be of extreme efficiency and long life.

Failure in other packings has been due to a large extent to the lack of a proper bonding material in the composition, and in the present invention, this function is obtained by the use of the unvulcanized rubber primarily, although the palm oil assists to some extent. Then too, the use of rubber gives a marked degree of resiliency to the packing, making it unnecessary to tighten the gland as often as usual. I consider this use of unvulcanized rubber or substantial equivalents or substitutes, as one of the most important features of my invention, as with it a packing is produced which is successful beyond any doubt, whereas others have been partial or complete failures. I am aware that vulcanized rubber has heretofore been used in packings, but it is unsuitable to the present invention as it would not allow the packing material to pack into proper shape when tamped into place, but would rebound after each tamping impulse. Moreover, in a loose packing, the various components thereof would not become bound together under pressure as when using unvulcanized rubber.

The presence of sulphur in the mixture possesses important functions. First, it preserves the unvulcanized rubber by protecting it from oxidation. Second, which is a very important factor, it insures that the long asbestos fibres shall each retain a coating of rubber plus sulphur, and this coating is just sufficient to produce the necessary bonding of the material when compressed into the stuffing box. When the packing is in service, there is sufficient heat generated to actuate the sulphur and cause the necessary vulcanization of the product, which further increases the bond. Due to the small percentages of rubber and sulphur which are ordinarily employed however, the product cannot vulcanize to such a hard state as to be inefficient as a packing medium.

The graphite serves with the palm oil as an effective lubricant and produces with the other ingredients, a packing which is as near frictionless as possible.

The product is not sticky for the reason that the graphite flake is superimposed on the fibres, but there is sufficient rubber content to form a homogeneous ring when the intermeshed strips of soft metal and the long fibres are jointly compressed in the stuffing box or any other confined space. The rubber exists in such small quantity that it does not act materially as a space filler, but it is an efficient binder for the various other ingredients. When this rubber vulcanizes under heat, it will not harden the entire body of packing, in view of the relatively insignificant amount used, and consequently it will not decrease the efficiency of the packing.

The improved packing can be used in all cases where packing is necessary, such as steam engines, valves, pumps, hydraulic machinery, etc., and I have found that only one packing is necessary for almost all equipment, regardless of the size of the stuffing box. Many important industries are today successfully using the product in stuffing boxes ranging in size from the smallest to the largest and it is overcoming packing troubles which have heretofore caused what has been considered necessary waste, for instance by escape of gas, steam or liquid or by virtual burning out of the packing in short time. Then too, in stuffing boxes which have always given trouble for such reasons as blowing out of the packing or scoring of the shaft or rod by such packing, the present invention is absolutely successful and not only does it fail to score the rod or shaft, but it has a tendency to fill up small imperfections, producing an absolutely smooth shaft or rod, making it possible to pack the latter in a positively tight manner.

On account of the existing advantages for the subject matter herein described, the present disclosure is preferably followed. However, within the scope of the invention as claimed, variations may of course be made and while in claiming my invention, I have used the word "rubber", I wish it distinctly understood that this wording also contemplates any substitute or substantial equivalent, for instance those above enumerated.

I claim:—

1. A composite, loose, substantially dry, rod and shaft packing having substantially 98% of its mass formed of soft metal fragments, yieldable fibre and lubricant, and having substantially 2% of said mass formed of unvulcanized rubber acting primarily as a binder instead of a space filler.

2. A composite dry packing formed primarily from shredded soft metal, long staple fibre and graphite, and having substantially 2% of its mass formed of unvulcanized rubber, whereby said rubber serves primarily as a binder instead of a space filler.

3. A packing comprising a loose and dry substantially homogeneous mixture consisting of substantially 2% unvulcanized rubber, 60% shredded soft metal, 11% long staple fibre, 23% graphite, and a lubricating oil, the rubber acting primarily as a binder instead of a space filler.

4. A process of producing a loose, substantially dry, rod and shaft packing, comprising the steps of forming a rubber solution, mixing soft metal fragments, yieldable fibre and lubricant with said solution, evaporating the solvent, and disintegrating the resultant mass to a loose condition.

In testimony whereof I have hereunto affixed my signature.

HERBERT STANLEY WALKER.